United States Patent [19]

Bryngdahl

[11] 4,138,190
[45] Feb. 6, 1979

[54] GEOMETRICAL TRANSFORMATIONS IN OPTICS

[75] Inventor: Olof Bryngdahl, Cupertino, Calif.

[73] Assignee: Xerox Corporation, Stamford, Conn.

[21] Appl. No.: 727,304

[22] Filed: Sep. 24, 1976

Related U.S. Application Data

[63] Continuation of Ser. No. 544,526, Jan. 27, 1975, abandoned.

[51] Int. Cl.² .................. G02B 5/32; G03H 1/08; G02B 27/38
[52] U.S. Cl. ................................ 350/3.70; 350/3.66; 350/162 SF
[58] Field of Search ................ 350/3.5, 162 SF, 3.70, 350/3.66

[56] References Cited

U.S. PATENT DOCUMENTS 3,540,791  11/1970  Caulfield et al. ............... 350/3.5

OTHER PUBLICATIONS

Goodman et al., *Jour. of the Optical Society of America*, vol. 63, No. 1, Jan. 1973, pp. 50–58.

*Primary Examiner*—Ronald J. Stern

[57] ABSTRACT

Geometrical image modifications such as coordinate transformations and local translation, inversion, reflection, stretching which require space-variant optical coherent systems are provided by introducing phase filters having a predetermined phase function into optical coherent systems in such a manner that the local phase variations influence light from local object areas. In one embodiment, the object distribution is multiplied by the phase function so that its spectrum at the frequency plane constitutes the desired transformation. In a second embodiment, the aforementioned concept is applied to produce a transformation in an image plane. The phase filters, in a preferred embodiment, comprise computer generated holograms.

1 Claim, 13 Drawing Figures

GEOMETRICAL TRANSFORMATIONS IN OPTICS

This is a continuation, of application Ser. No. 544,526, filed Jan. 27, 1975, now abandoned.

BACKGROUND OF THE INVENTION

An inherent advantage in using optical methods in information processing is that these systems can perform data processing operations in parallel. In contrast to the advantage provided by parallel processing, the space invariance of most conventional imaging techniques limits the utilization of optical data processing techniques in certain instances. For example, the features of both parallel processing and space variance are necessary for general map transformations using optical schemes.

Although prior art elements such as corrector plates, axicons, conical lenses and ring lenses have been utilized to provide local image modifications, they are generally inadequate for purposes of information processing.

Alternate techniques for providing general types of coordinate transformations as well as local image modifications include image processing with digital techniques, fiber optic devices and scanning systems, both optical and electronic. These techniques, however, are indirect and relatively complex.

Therefore a need exists for a direct, relatively non-complex optical technique for providing a space variant system which, in turn, allows general types of coordinate transformation as well as local image modifications such as translation, stretching and rotation to be achieved.

SUMMARY OF THE PRESENT INVENTION

The present invention provides method and apparatus for providing geometrical transformations using optical techniques wherein a space-variant, optical coherent system is provided to influence the light from each point of the object. The space-variant system introduces a specific deflection and focusing power to the light from each point of the object distribution independently allowing any light distribution on a surface of general shape to be displayed onto another arbitrarily shaped surface. In particular, geometrical image modifications such as coordinate transformations and local translation, inversion, reflection, stretching, which require space-variant systems are provided by introducing phase filters having a predetermined phase function into optical coherent systems in such a manner that the local phase variations influence light from local object areas. In one embodiment, the object distribution is multiplied by the phase function so that its spectrum at the frequency plane constitutes the desired transformation. In a second embodiment, the aforementioned concept is applied to produce a transformation in an image plane. The phase filters, in a preferred embodiment, comprise computer generated holograms. The space-variant, optical coherent system provided in accordance with the teachings of the present invention may replace conventional optical components utilized in lenses and corrector plates for field flattening, or utilized as spatial filters for optical data processing, coding and decoding optical data or imaging on curved surfaces.

It is an object of the present invention to provide a space-variant, optical coherent system for performing general types of map transformations.

It is a further object of the present invention to provide a space-variant, optical coherent system for performing geometrical image modifications such as coordinate transformations and local translation, inversion, reflection, stretching and rotation.

It is still a further object of the present invention to provide a space-variant, optical coherent system for performing general types of map transformations wherein the local phase variations of phase filters intorduced into the system influence light from local object areas.

It is an object of the present invention to provide a space-variant, optical coherent system for parallel processing of optical information.

DESCRIPTION OF THE DRAWINGS

For a better understanding of the invention as well as other objects and further features thereof, reference is made to the following description which is to be read in conjunction with the following drawing wherein.

FIGS. 8(a)-8(g) illustrate one-dimensional image modifications using a variable one-dimensional phase filter of the grid type;

FIGS. 10(a)-10(d) illustrate computer generated hologram phase filters for performing two-dimensional transformations;

FIGS. 11(a)-11(d) illustrate the image transforms corresponding to the phase filters shown in FIGS. 10(a)-10(d);

DESCRIPTION OF THE PREFERRED EMBODIMENTS

The primary purpose of the present invention is to produce a system for realizing general geometrical transformations using optical techniques. A space-variant system is provided to influence the light from each point in an object. Such a system will introduce a specific deflection and focusing power to the light from each point of the object distribution independently. This allows any light distribution on a surface of general shape to be displayed on another arbitrarily shaped surface and incorporate image modification such as local stretch rotation and translation.

Figure 1:
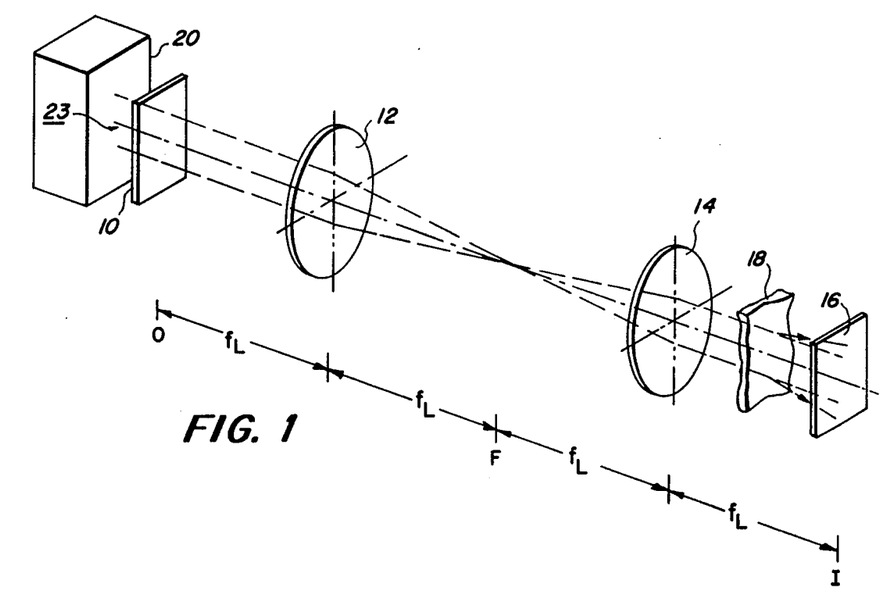
FIG. 1 illustrates a conventional imaging system.

FIG. 1 illustrates a conventional imaging system. Object 10, located at object plane O, is spaced apart from an objective lens 12, lens 12 being separated from object 10 by a distance equal to the focal length $f_L$ of lens 12. The objective lens 12 focuses and directs the light incident thereon onto a second lens 14, separated from lens 12 by a distance equal to the back focal length of lens 12 and the front focal length of lens 14. Lens 14 directs the light incident thereon to image plane 16 via a phase plate 18 located at plane P. Image plane 16 is separated from lens 14 by a distance equal to the back focal length of lens 14. The distance between phase plate 18 and image plane 16 is arbitrary.

In operation, the object 10, such as a transparency, is exposed to a source of coherent illumination 20, such as a laser, the coherent light 22 emitted therefrom being directed through transparency 10 to lens 12. The light amplitude distribution projected by lens 12 to frequency plane F will be a Fourier transform of the light amplitude distribution transmitted through the transparency 10. Lens 14, in essence, performs a second or inverse Fourier transform on the light distribution thereon, reconstructing the original light distribution transmitted by transparency 10, onto image plane 16 via phase plate 18. The use of a single phase plate 18 (either reflective or refractive) will not make the system completely space-variant. The influence of the irregular phase plate 18 is strongly dependent on its location along the optical axis; the further phase plate 18 is from either object 10 or image plane 16, the stronger is its optical influence. Increasing this distance, however, eliminates the possibility of separately influencing different object areas. Diffractive systems allow multiplexing on optical images but refractive and reflective systems do not. That is, the full aperture of the diffractive system may be shared by a large number of image forming elements. Selectivity may be achieved by incorporating volume effects. Thus, a thick hologram placed somewhere between object 10 and image plane 16 may provide space variation. However, volume holograms are difficult to produce because it would be necessary to multiplex as many subholograms as there are number of points in the object plane. Alternately, a phase filter may be placed in the object (or an intermediate image) plane, i.e. the only plane where the information about individual object elements is laterally separated. However, any phase variation introduced in the object plane will have no influence on the location of the image points in image plane 16.

Figure 2:
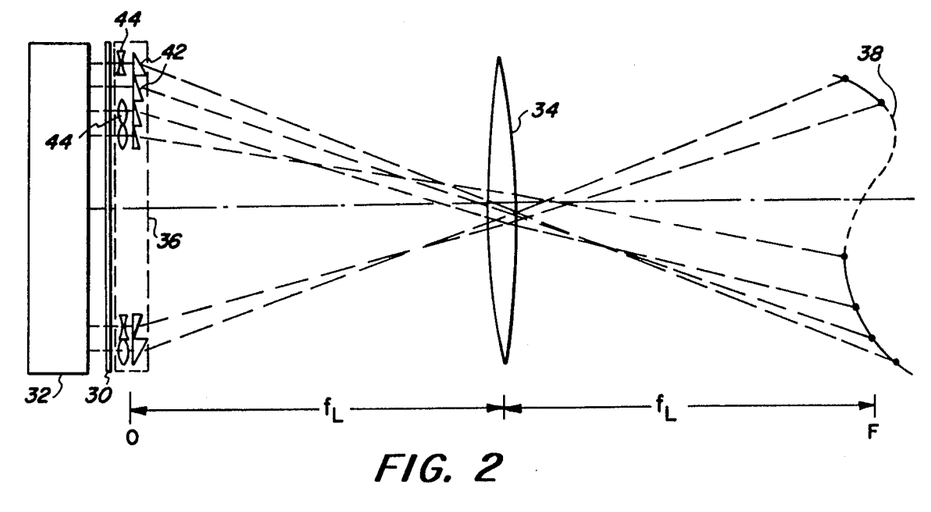
FIG. 2 is a first embodiment of an optically coherent space-variant system in accordance with the teachings of the present invention.

In accordance with the teachings of the present invention, the prior art system shown in FIG. 1 is modified as shown in FIG. 2 (and FIG. 3 as will be set forth hereinbelow) to produce a space-variant system. In this sytem, a phase filter with the proper phase variation is placed in the object plane so that the transformation of the object distribution is formed around the frequency plane F.

Object or transparency 30 is coherently illuminated from laser source 32. Lens 34, separated from the object plane by a distance equal to its front focal length $f_L$, displays the Fourier transform of the complex transmission of transparency 30 in the frequency plane F. Frequency plane F is separated from lens 34 by a distance equal to the back focal length $f_L$ of lens 34. A phase filter 36 having a predetermined phase variation is positioned at the object plane so that the transformation of the object distribution is formed around plane F. The local phase variation of phase filter 36 is represented in the figure as a combination of prismatic (first) and focusing (second order term) effects, the prism 42 bending the light, the optical elements 44 focusing the light incident thereon. The transformed object distribution is displayed in the frequency plane F of the optical system. As can be seen, the two dimensional optical information in transparency 30 (one dimension into the plane of the figure) is transformed into a curved surface 38 at frequency plane F.

The techniques utilized to fabricate a phase filter with the proper phase variation will be set forth hereinafter.

Lens 34 as set forth hereinabove, produces in its back focal plane F a frequency spectrum (Fourier transform) of the amplitude transmission function in its front focal plane, i.e. the object plane. The concept of providing Fourier transforms of amplitude distributions by optical techniques is well known and will not be set forth herein.

Figure 3:
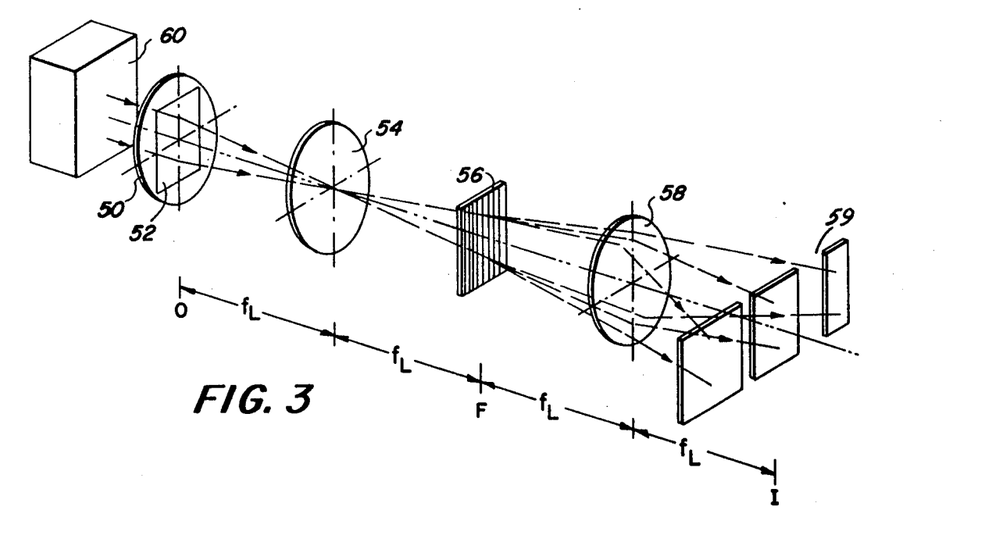
FIG. 3 is a second embodiment of an optically coherent space-variant system in accordance with the teachings of the present invention.

Referring now to FIG. 3 a space-variant, coherent optical system for producing transformations in an image plane is illustrated. FIG. 3 is, in essence, the system shown in FIG. 1 with the addition of two phase filters. One of the phase filters is placed in the object plane so that light from different parts of the object will be laterally separated and directed to the frequency plane F. The other phase filter is place in the frequency plane F in order to modify the information from various portions of the object field in a predetermined manner. Transparency 50 is placed in contact with (or imaged onto) phase filter 52 located in the object plane. A lens 54 is interposed between the object plane and a second phase filter 56 positioned at the frequency plane F. A lens 58 images the light amplitude distribution incident thereon onto image plane 59. Lens 54 is separated from the transparency 50 by a distance equal to its front focal length and phase filter 56 is separated from lens 54 by a distance equal to the rear focal length of lens 54.

A source of coherent light 60, such as that produced by a laser, is provided to expose object 50.

In operation, the coherent light emitted by source 60 is incident on transparency 50, phase filter 52 laterally separating the light from different parts of the transparency and directing the light to the frequency plane F. Lens 54 forms a Fourier transform of the light amplitude distribution transmitted through phase filter 52 at the plane of phase filter 56 (frequency plane F). Phase filter 56, selected to have a predetermined phase variation as will be described hereinafter, modifies information from various portions of the object field in a predetermined manner, the modified information being directed to lens 58 which projects an image on image plane I. Lens 54, as set forth hereinabove, acts essentially as a spectrum analyzer producing in its back focal plane (frequency plane) the spectrum of the transmission function in the front focal plane (object plane). The points of light in the frequency plane F are thereafter used as the object in the front focal plane of lens 58, the back focal plane (image plane 59) of lens 58 containing the spectrum of the light in the frequency plane F. Lens 58 therefore produces a transform of a transform that is in effect an inverse transform which gives the original transmission function as modified by phase filters 52 and 56. Any object in the object plane of lens 54 will be maged by lenses 54 and 58 into the image plane I of the optical system. Phase filters 52 and 56 are formed in a telecentric arrangement with lenses 54 and 58 forming an image at image plane I of the modified object 50.

The following describes the procedure to be utilized for designing specific phase filters to be utilized in the FIG. 2 and FIG. 3 embodiments to allow the optical geometrical transformation of information from the object plane into either the frequency or image planes.

The change in direction of a light wave caused by a phase filter is given by the eikonal equation. In the simplified, specific case of a transformation of an amplitude distribution, a(x, y), in the object plane onto another flat surface, u, v, in the frequency plane F, of FIG. 2, the normal to the wavefront at the point (x, y) represents the ray direction, i.e., $(1/k)(\delta\phi/\delta x)$; and $(1/k)(\delta\phi/\delta y)$, where $\phi(x, y)$ represents the phase function introduced in the object plane O and $k = \delta\pi/\lambda$. Thus, in the paraxial region, light from (x, y) will hit plane F in $$u = \frac{f_L}{k} \frac{\delta\phi(x,y)}{\delta x}, \quad v = \frac{f_L}{k} \frac{\delta\phi(x,y)}{\delta y} \quad (1)$$

The relationship between the complex amplitude distribution in the object or image planes, and the frequency plane, F, in FIGS. 2 and 3 is given by the Fourier transform $$\tilde{a}(u,v) = \int_{-\infty}^{\infty}\int a(x,y)\exp[i\phi(x,y)] \quad (2)$$

$$\times \exp[-iK(xu + yv)/f_L] \, dx \, dy.$$

For large k, the method of stationary phase can be applied to find an approximate solution to eq. (2). The main contribution to the integral arises from the neighborhood of the saddle-points which are obtained when the derivatives $\delta/\delta x$ and $\delta/\delta y$ of the exponent are equal to zero, i.e., $$\frac{\delta\phi(x,y)}{\delta y} = \frac{k}{f_L} v. \quad (3)$$

which, is identical to eq. (1). The solution to eq. (2) can now be calculated by approximating the exponent around the saddle-points and adding the contributions to obtain the distribution, a. Since it is desired to achieve specific, relative locations among the image points, the solution looked for will be the phase function $\phi(x, y)$ which will give the transformation ti $u = u(x,y), v = v(x,y)$ (4)

The answer is given by introducing into eq. (3) the transformation desired as represented by eq. (4). The transformation described so far is obtained between an object and a frequency (Fraunhofer diffraction) plane.

There are several ways to physically obtain the necessary phase variation $\phi(x, y)$. For example, refractive or reflective elements can be formed by varying the thickness or the shapes of their surfaces. If blazed grating techniques are used to produce the components (then frequently called kinoforms) the total phase variation required is limited to $2\pi$. This makes it possible to use photographic procedures for their formation.

A preferred technique for shaping wavefronts is to use computer-generated binary holograms, because they may be made in a binary fashion and may be utilized in line as well as off-axis configurations.

To illustrate the aforementioned technique in a situation wherein presentation of geometric similarity is desired (geometrical transformation of the object onto the frequency plane F), u = x and v = y is introduced in equation 3. This results in $$\phi(x,y) = \frac{\pi}{\lambda_L}(x^2 + y^2) + \text{constant,} \quad (5)$$

The phase variation of equation (5) for a first transformation may be obtained by replacing the phase filter 52 with a conventional lens having a focal lens $f_L$ or, in holographic terms, a corresponding Fresnel zone-plate, in the object plane.

The phase variation of phase filter 52 (FIG. 3) is determined by equation (5) whereas the phase variation of phase filters 36 (FIG. 2) and 56 (FIG. 3) will be determined by the desired transformation. As set forth hereinabove, computer-generated holograms may be utilized to provide the desired wavefronts.

In order to provide a conformed transformation from the given x, y - plane (z - plane) into any given domain of the u, v plane (w - plane) and the function w = f(z) is known the following procedure is utilized to optically realize the transformation.

A specific example will show how an area in the z - plane is mapped onto a portion of the interior of the circle, r = p, in the w - plane, the following equation being utilized:

$$w = pe^{-z^*/q} \quad (6)$$

(p and q are lengths). The square area $0<x/q<\pi$; $0<y/q<\pi$ in the z-plane then corresponds to the half annulus $pe^{-\pi}<r<p, 0<\phi<\pi$ in the w-plane. Introduction of eq. (6) in eq. (3) results in $$\frac{f_L}{k}\left(\frac{\delta\phi(x,y)}{\delta} + i\frac{\delta(x,y)}{\delta y}\right) = pe^{-x/q}e^{iy/q} \quad (7)$$

which can be written $$\frac{\delta\phi(x,y)}{\delta x} = \frac{pk}{f_L}e^{-x/q}\cos y/q. \quad (8)$$

$$\frac{\delta\phi(x,y)}{\delta y} = \frac{pk}{f_L}e^{-x/q}\sin y/q.$$

Solving equation (8) results in $$\phi(x,y) = -\frac{pqk}{f_L}e^{-x/q}\cos y/q + \text{constant} \quad (9)$$

Figure 4:
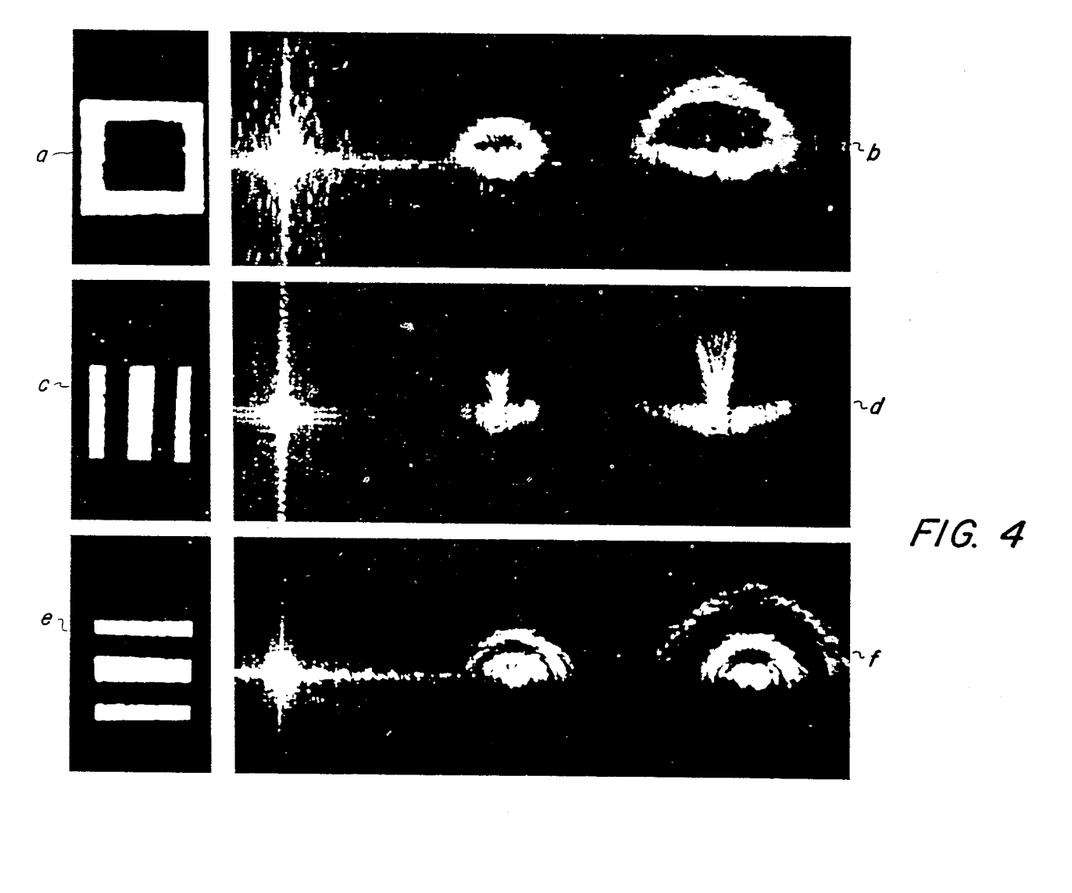
FIG. 4 illustrates examples of conformal mapping utilizing the embodiment set forth in FIG. 2.

As will be described hereinafter, the equation (9) solution was incorporated in a computer-generated hologram. FIG. 4 shows some examples of this transformation (image modifications). The light distributions (object transparenices) that illuminated the hologram are on the left of the figure, the corresponding reconstruction in the frequence plane F (transformations) are on the right. Two diffraction orders are included in the displays and, of course, the second order is twice the size of the first. The computer generated hologram used had 80 fringes.

Examples of images modifications using the embodiment of FIG. 3 are illustrated in FIGS. 5(b)–(g), FIG. 5(a) being the object. The resultant transforms of the object are shown in FIGS. 5(b)–(g). The computer generated holograms utilized contained approximately 300 fringes. The transformed distribution appears in an image plane of the original object. To achieve the transformation, a one-dimensional grid structure with a linear increase in spatial frequency (other phase variation could also have been chosen) was placed in the object plane. In the frequency plane, F, the first diffraction orders are then extended and $u \propto x$ in a manner as set forth hereinabove. A second one-dimensional grating (hologram) was placed over one of the first diffraction orders in F. The rest of this plane was blocked with a mask. In the image plane I, several diffraction orders appear due to the grid in F. The zeroth order is a copy of the object distribution. The first order will be a modified image because of the phase variation introduced by the synthetic hologram in F.

Figure 5:
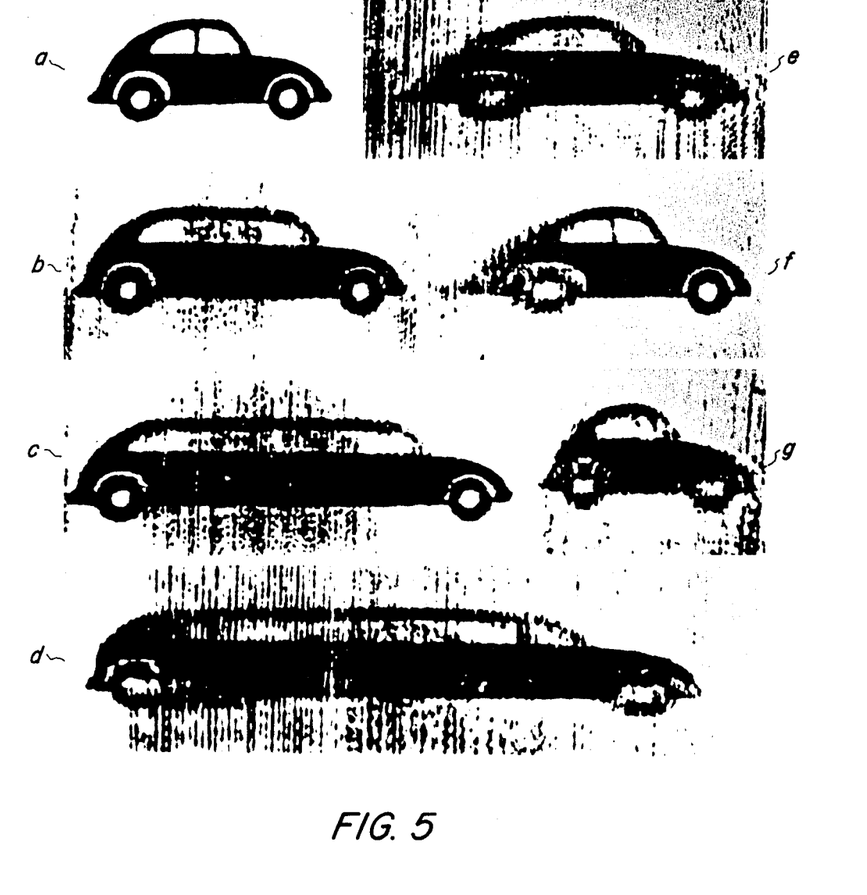
FIG. 5 illustrates examples of image modifications using the embodiment set forth in FIG. 3.

Grids with an error-function frequency variation were used in FIGS. 5(b)–(d). A local stretch in the middle of the object is applied so that the wheels of the car (object) remain round. In FIGS. 5e and g, a lateral magnification and in FIG. 5f an exponentially increasing magnification is introduced. This imaging scheme may be utilized to perform two-dimensional transforms if desired.

As set forth hereinabove, two optical schemes for performing geometrical transformations have been disclosed. In the first technique (one transformation), a light distribution in a non-image plane (frequency plane P) is achieved that corresponds to the configuration of the desired transformation. In the second technique (two transformations), a modified imaging system is provided by incorporation of phase filters.

The first technique introduces a phase function in the object plane so that the lateral distribution of its frequency spectrum conforms with new relative locations among the object points. The frequency spectrum is displayed in the focal plane of a lens, as indicated in FIG. 2. The shape of the phase function, $\phi(x,y)$, is given by Eqs. (3) with the transformation wanted inserted according to Eqs. (4). The transformation is independent of the object configuration as long as a pure amplitude object distribution with relatively coarse structures is introduced or imaged onto the object plane of FIG. 2. The irradiance of the transformed distribution will vary with the amount of local magnification.

The second technique modifies an imaging system in such a way that each point of the object can be individually influenced. A nonimage plane distribution is needed in which light from each object point is laterally separated. A phase filter is placed in the object plane so that different prismatic and focusing effects influence the image location of the various object points. A preferred solution is illustrated in FIG. 3. The telecentric lens system, comprising lenses 54 and 58, images transparency 50 onto image plane I. Placing a lens in the object plane will result in an extended illuminated area in the frequency plane F with a light distribution similar to the one in the object plane. A convenient size of this area is obtained by proper choice of the focal length of the added lens. The filter performing the transformation wanted is placed in F. In constructing this filter, the phase variation in the light illuminating it should be considered. For convenience, it is practical to introduce a quadratic phase variation, e.g., a conventional lens, in the object plane which produces a spherical wave incident on the plane F. The amplitude in the image plane is $$a_I(x,y) = \int\int_{-\infty}^{\infty} \tilde{a}(u,v)\exp\{i\phi(u,v)\} \quad (10)$$

$$\times \exp\{-ik(ux+vy)/f_L\}du\,dv$$

where $\phi(u,v)$ is the phase filter introduced in the frequency plane F to obtain the final image transformation in the image plane I of FIG. 3. The phase variation of the incident light on F, now due to a lens in the object plane is described by $\exp(i\pi(u^2+v^2)/(\lambda/f_L))$ Equation (10) is solved by approximately the saddle points and adding the contributions to obtain the distribution. After introduction of the spherical phase factor, the result is $$x = u + \frac{f_L}{k}\frac{\delta\phi(u,v)}{\delta u}, \quad y = v + \frac{f_L}{k}\frac{\delta\phi(u,v)}{\delta v} \quad (11)$$

which describe the achieved transformation.

Means for influencing the phase variation of the light in certain planes of optical systems, i.e. phase filters, are needed to realize map transformations. Several kinds of elements may be used. They can be either refractive, reflective, diffractive, or a combination of these.

The most convenient way to manufacture the phase filter is to shape a surface proportionally to $\phi(x,y)$. A refractive element, may be obtained not only by surface relief but also by using internal reflective index variations. Although some common wavefront shapes can be achieved with available optical components, general shapes seem, however, difficult to produce, especially using grinding techniques.

The blazed grating type filter is a hybrid between a refractive and a diffractive element. The maximum phase retardation in the filter required to form the $\phi(x,y)$-shaped wavefront is reduced to $2\pi$. This amount of variation is easily obtained by utilizing the changes of optical thickness that occur in processed photographic emulsions. However, the precision needed in the lateral variation of the optical path is still high if in-line filters like kinoforms are produced. On the other hand, it is a powerful and easily applicable technique for improving diffraction efficiency in off-axis holograms.

Any grid structure may be considered as a synthetic interferogram (image hologram). Thus, illumination with a plane wave will result in a diffracted wave. Its phase variation is determined by the location of the grid lines, which constitute niveau curves $2\pi$ apart. This makes the filter simple to manufacture, but it also has disadvantages. More waves than the one wanted are formed, and spatial-filtering procedures are, in general, complicated because of the inline character of the filter. However, limited portions of grid structures often show off-axis effects.

Holograms possess attractive features that make them the preferred form of phase filters. For example, the shape of the wavefront created is determined by the lateral geometrical properties of the filter, and the filters can produce any angular separation among the reconstructed wavefronts. Furthermore, they can be made in a binary fashion, and amplitude variations are easily incorporated. This is important when extensive local-area changes are involved. Computer generated holograms have been successfully utilized as phase filters. Computer-generated holograms are binary i.e. they consist of many transparent areas on an opaque background and have a real nonnegative amplitude transmittance and are able to influence the phase of a light wave.

Several different techniques are available for forming computer generated holograms. For practical production of phase filters, the binary technique using the "detour phase" concept is convenient and has been utilized, except for FIG. 4, to form the transformations set forth herein. In this type of application, in which the phase varies in a continuous fashion, the holograms are formed with continuous fringes and are identical in appearance to hard-clipped interferograms. A technique for realizing the detour plane hologram is set forth in the article *Binary Fraunhofer Holograms, Generated by Computer*, A. W. Lohmann and D. P. Parris, Applied Optics, Volume 6, No. 10, Page 1739 (1967) the teachings of which are incorporated herein by reference. The specific problems here allow considerable simplification of the statements that characterize the filters so they may seem slightly different than the "detour phase" hologram. Therefore, descriptions of some specifics of the approach will be set forth.

The location of the fringes in an interferogram (hologram) formed between a wave $\exp(i\phi(x,y))$ and a plane wave inclined at an angle $\theta$ to the interferogram plane is $$\frac{2\pi}{\lambda} x \sin\theta - \phi(x,y) = 2\pi n \qquad (12)$$

where n are integers. This recording can now, in the conventional sense, be used as a filter (hologram). In the first diffraction order, $$\sin\theta = \lambda V_o$$

holds, where $V_o$ is the spatial frequency that corresponds to a deflection $\theta$. Illumination with a plane wave results in a reconstructed wave $$\exp\{iW\} = \exp\{i\phi(x,y) + i2\pi x V_o\} \qquad (13)$$

If v(x,y) now indicates the frequency variation over the filter then its components in the x and y direction are related to $\phi$ by $$2\pi V_x = \frac{\delta W}{\delta x} = \frac{\delta\phi}{\delta x} + 2\pi V_o; \qquad (14)$$

$$2\pi V_y = \frac{\delta W}{\delta y} = \frac{\delta\phi}{\delta y}$$

Clearly, by proper variation of the spatial frequency and the orientation of the grid structure in the filter any shape of the wavefront is possible. In the computer-generated filters successfully utilized, the frequency v(x,y) is the decisive parameter. Prismatic as well as lens effects can be introduced. Here, lateral modifications of object-light distributions are exemplified. Thus, a local variation of light deflection over the grid structure is required. According to Eqs. (14), the angular components of the deflection are $$\frac{\delta\phi}{\delta x} = 2\pi\{V_x - V_o\}; \frac{\delta\phi}{\delta y} = 2\pi V_y$$

Other types of computer-generated holograms have also been successfully utilized. For example, the transformation shown in FIG. 4 was produced by an image-plane binary hologram, the realization of which is disclosed in the article *Binary Synthetic Hologram*, Wai-Hon Lee, Applied Optics, Volume 13, page 1677 (1974), the teachings of which are incorporated herein by reference.

The optical geometrical transforms described hereinabove were successfully implemented as will be described hereinafter.

To simplify the plotting procedure of the computer-generated phase filters, they were constructed in the form of two orthogonal grating structures. This is possible only if the x and y dependences of $\phi$ are separable.

To demonstrate preservation of geometrical similarity, a phase filter $$\phi(x) 32\ kx^2/(2f_L),\ \phi(y) = ky^2/(2f_L), \qquad (16)$$

has to be placed in the object plane in the FIG. 3 embodiment. Then, Eqs. (15) give the necessary frequency variations in the filter $$V(x) = V_o + x/(\lambda f_L);\ V(y) = V_o + y/(\lambda f_L). \qquad (17)$$

Figure 6:
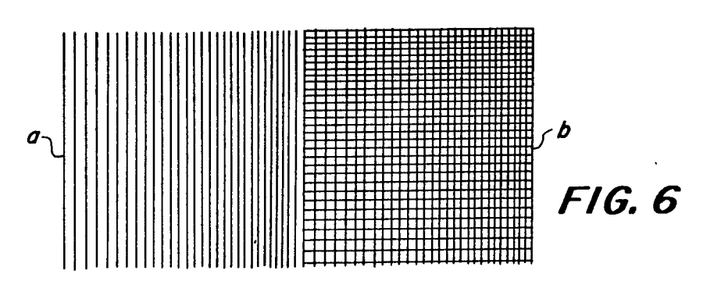
FIGS. 6(a) and 6(b) illustrate computer-generated holograms of the grid type which may be utilized as phase filters to realize map transformations in accordance with the teaching of the present invention.

This grid structure was plotted in a large format with 300 lines per direction and with a frequency range 1 to 2. FIG. 6(a) shows one grating; FIG. 6(b) shows the crossed-grating version, the grid structures having a linear change of spatial frequency. This figure is illustrated for clearness with 30 fringes and was photographically reduced to about 4.5×4.5 mm². The spatial frequencies then ranged from 40 to 80 lines/mm. With this choice of range, no overlap between the 1st and 2nd diffraction orders occur. However, a larger range could have been used; the 2nd order was weak, owing to the choice of opening ratios in the grating. This filter was placed in contact with an amplitude object in the front focal plane of a lens ($f_L$=200mm) as indicated in FIG. 2. Illumination with collimated laser light gave the light distribution in the back focal plane (F in FIG. 2) that is reproduced in FIG. 7(a). The object here was a 90° sector of a circular grating. The displayed distribution appears as the cross terms due to the crossed gratings used as a phase filter. It is interesting to note that, in this case, the transforms in one diagonal of the figure are equivalent to introducing a positive and a negative lens, respectively, in the object plane. Each transform in the other diagonal is caused by a combination of a divergent wave in the orthogonal direction.

Figure 7:
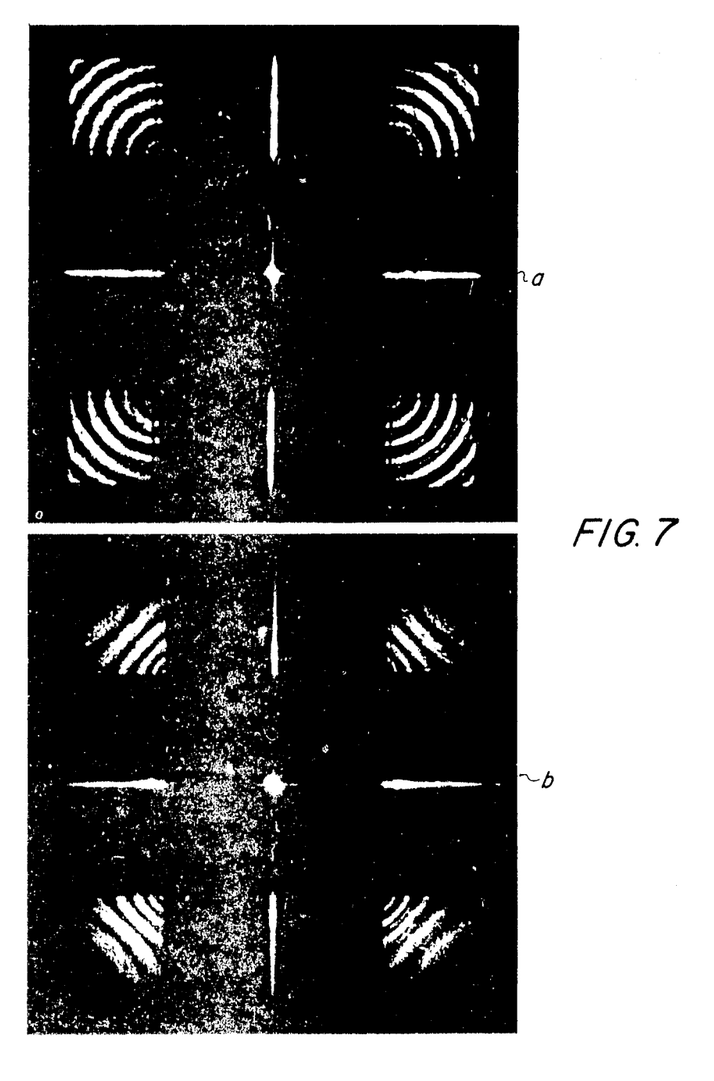
FIGS. 7(a) and 7(b) show the transformed object distributions produced by the phase filters of FIGS. 6(a) and 6(b) respectively.

Another example is shown in FIG. 7(b), which shows the display of transformed object distributions in a Fraunhofer diffraction plane. Crossed grids were placed in contact with the object, the grids being linear in frequency in FIG. 7(a) and in period in FIG. 7(b). Here same object is used, but the filter is now linear in period 1/v instead of in v as in FIG. 7(a). This filter also had 300 lines in a period range 1 to 2. Its visual appearance was almost identical to the one used to obtain FIG. 7(a). However, the transform is strikingly different. The frequency variation in the x-direction of this filter is $$v = v_0/(1-px), \qquad (18)$$

where $v_0$ and p are constant factors. The corresponding transformation in the u direction in the frequency plane F, is found by introducing Eqs. (18) and (15) in Eqs. (3), $$u = \lambda f_L v_0 p x/(1-px). \qquad (19)$$

By this transformation, the circular grating has almost the appearance of a one-dimensional grid structure, indicating that any type of geometrical transformation is possible with this technique.

In order to produce one dimensional image modifications, the optical arrangement shown in FIG. 2, with the corresponding modification of one of the crossed gratings shown in FIG. 6(b), can be utilized to introduce the changes in the display.

An alternate technique is to utilize the embodiment shown in FIG. 3 with a one-dimensional grating placed in the object plane O. The frequency of this grating varies linearly with the distance across it, as shown in FIG. 6(a). 300 lines occupied 4.5×4.5 mm$^2$ and the frequency range was about 40-80 lines/mm. In the back-focal plane, F, of the lens 54 ($f_L$=200 mm), the different orders in the spectrum were elongated in one dimension. The phase filter that gives rise to the image modifications is now placed over one of the extended diffraction orders in F. The relation between the F plane and image plane I in the distorted direction is given by Eqs. (11) and (15), $$x = u + \lambda f_L \{V_u - V_o\} \quad (20)$$

Figure 8:
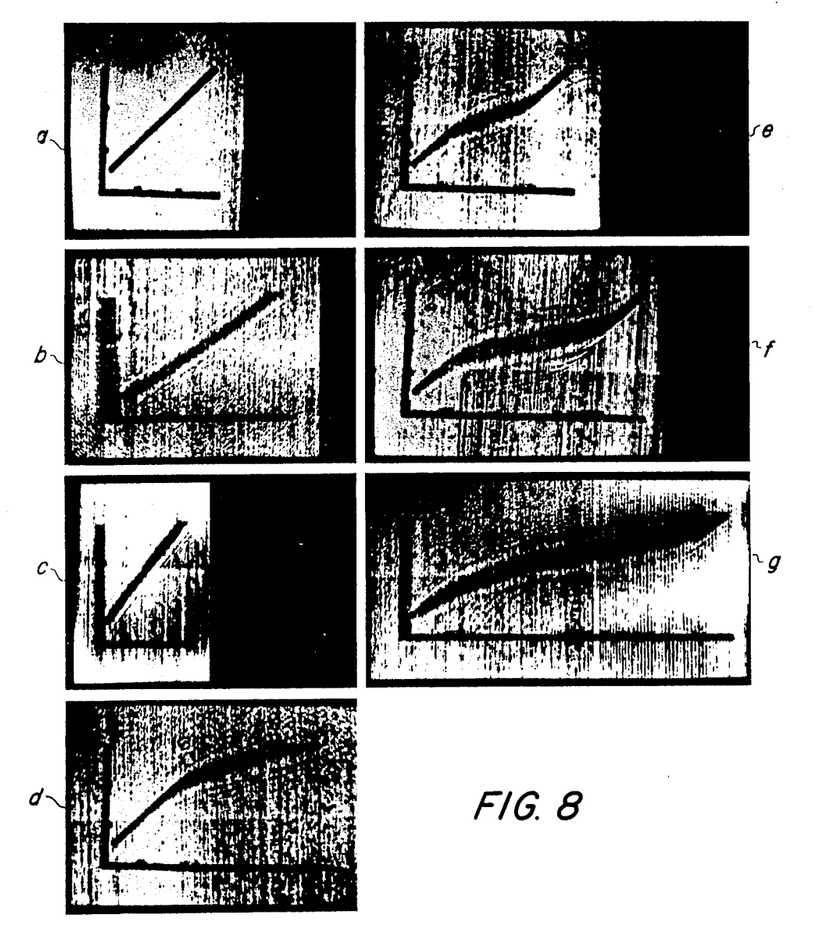
Figure 9:
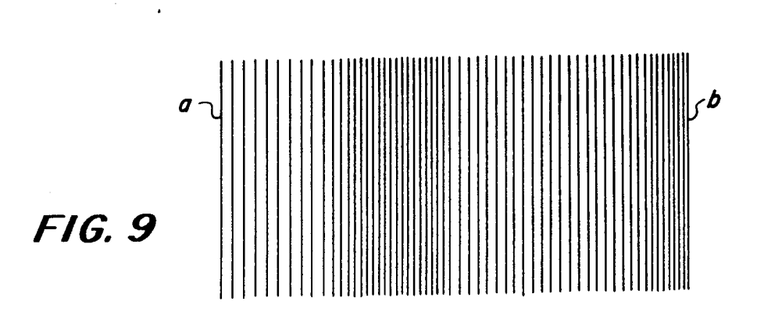
FIGS. 9(a) and 9(b) illustrate computer generated hologram phase filters for introducing local one-dimensional image modifications.

The term within the braces is the change introduced between image and object. A simple transform is a pure scale change. This is achieved by placing in F a grid structure the frequency of which is linear in u. In case $V_u = V_o + U/(\lambda f_L)$, then, according to Eq. (20) the image is magnified to double size in the x direction. On the other hand, $V_u = V_o - u/(\lambda f_L)$ reduces the image to a line in the y direction. Thus, an increase of spatial frequency magnifies the image and a decrease reduces it. This is shown in FIGS. 8(b) and 8(c). The object used is shown in FIG. 8(a). The other examples in FIG. 8 show that the technique is well suited to introducing local stretching in the image. In FIG. 8(d), an exponentially increasing magnification toward the right is shown. This was achieved by use of the filter in FIG. 9(a). The filter shown in FIG. 9(a) shows an exponentially increasing spatial frequency and is used to produce FIGS. 8(b) and 8(d). Stretches affecting only the central portion of the image are shown in FIGS. 8(e)-8(g). If δv/δu is described by a gaussian, then the change of location of the points in the image will be proportional to a normal distribution function. Three filters with different frequency ranges but the same value of standard deviation were used to form the images in FIGS. 8(e)-8(g). The filter corresponding to FIG. 8(f) is shown in FIG. 9(b), the spatial frequency increasing according to a normal distribution function.

The simplest technique for converting a conventional imaging system (see FIG. 1) into one that is able to perform a general two-dimensional geometrical transformation of any amplitude object distribution is indicated in FIG. 3 as set forth hereinabove. A lens placed in the object plane makes the lateral amplitude distribution in the frequency plane of the system proportional to the object distribution. The transformed image in the final image plane I [$x=x(u,v)$, $y=y(u,v)$] is obtained by placing a phase filter $\phi(u,v)$ in the frequency plane. The proper value for $\phi(u,v)$ is obtained by solving Eqs. (11) after introducing the value of x(u,v), y(u,v) (desired image configuration).

The phase filter that performs the mapping can be realized by constructing a regular type computer generated hologram which provided the transformations shown in FIG. 5.

Figure 10:
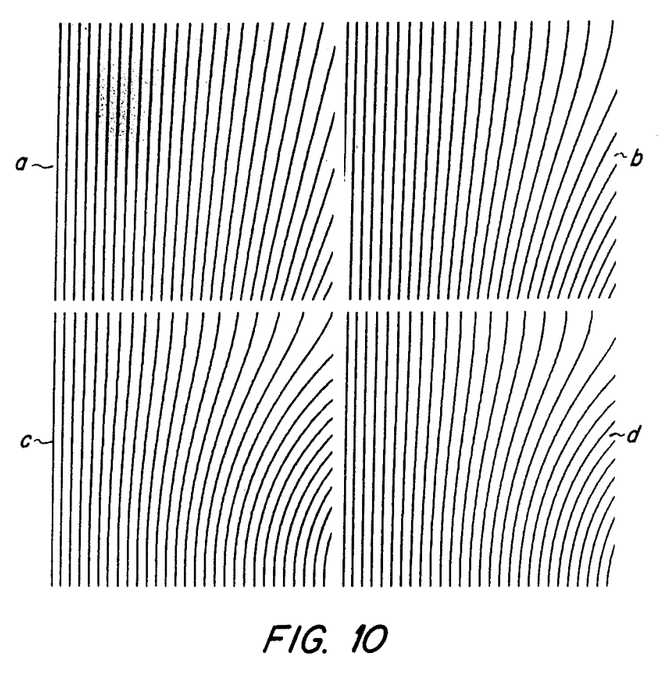
Figure 11:
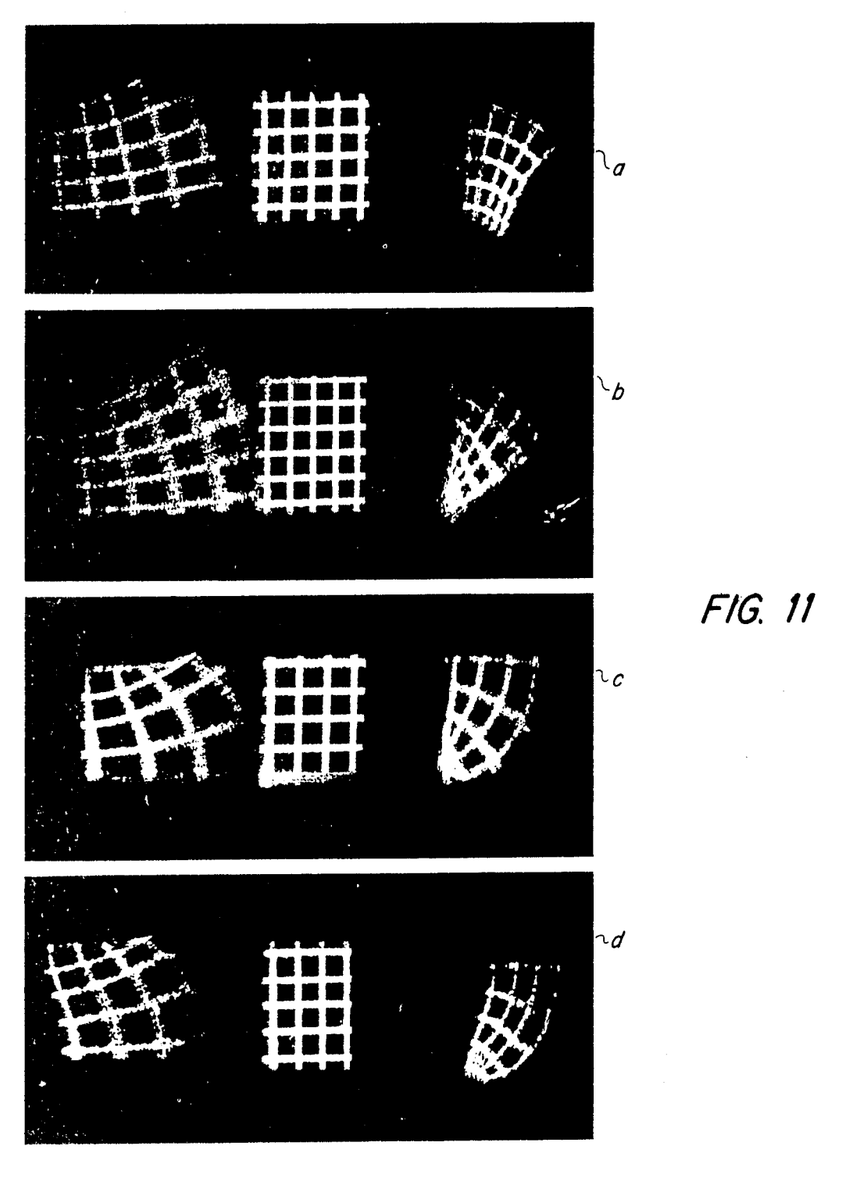
Figure 12:
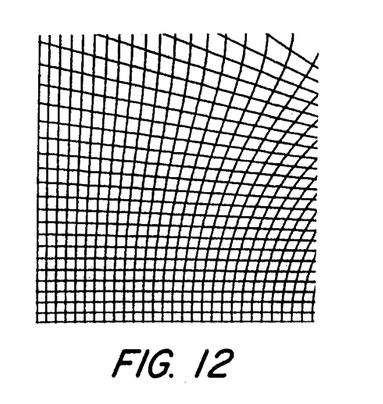
FIG. 12 illustrates a computer generated hologram crossed grid phase filter which transforms a square area conformally into a 90° portion of an annulus area.

Simple illustrations of the relations between frequency variations in the filter and distribution changes in the display are set forth hereinafter. FIG. 10 shows the filters $$V_u = \left\{1 - \frac{u}{2}(1-v)\right\} \quad (a)$$

$$V_u = \left\{1 - \frac{u}{2}\cos\frac{\pi v}{2}\right\} \quad (b)$$

$$V_u = \left\{1 - \frac{u}{2}\cos^2\frac{\pi v}{2}\right\} \quad (c)$$

$$V_u = \left\{1 + \frac{v}{3}\right\}\left\{1 - \frac{u}{2}\cos^2\frac{\pi v}{2}\right\} \quad (d)$$

for 0<u<1, 0<v<1. Each filter has 300 lines and $v_o$=80 lines/mm. The corresponding image-plane displays are contained in FIG. 12 for an object with coarse grid structure (1 mm bar separation). In the central 0th order, an image of the object appears. Both first diffraction orders are shown. Observe the difference between these orders; in one $x=u-\lambda f_L V_u$, $y=v-\lambda f_L V_v$ and in the other $x=u+\lambda f_L V_u$, $y=V+\lambda f_L V_v$. From this change of sign, if follows that an area contraction in one of the distorted images is related to an expansion in the other, a rotation in a positive sense in one with a negative rotation, in the other, etc. One line in FIGS. 11(a)-11(c) is not transformed, namely, the vertical bar to the very left in the object and in FIG. 11(d) one point, the lower-left hand corner.

Two crossed one-dimensional grid structures may be used as phase filters as set forth hereinabove. This implies that the variables are separable. Even in cases where this is not possible, the same type of approach may be applied. In some situations, this possibility had advantages. For example, different transforms of the same field can be displayed simultaneously, plotter requirements may be simplified, amplitude-uniformity considerations can be incorporated and it is helpful in some special space-variant spatial-filtering problems.

Figure 13:
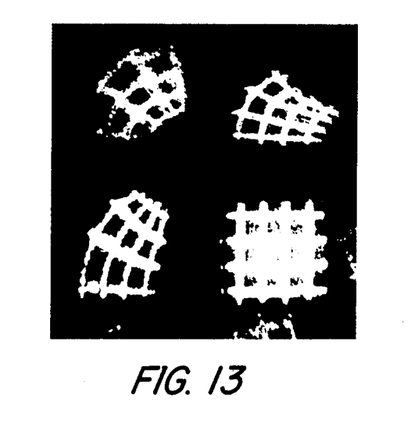
FIG. 13 is the image plane display made by using the phase filter of FIG. 12.

An example in which the transformed image is formed with a crossed-grid structure is illustrated in FIGS. 12 and 13. A filter of the shape shown in FIG. 12 was made by double exposure. The intended transformation (exponential transformation) was to map a square area conformally onto a 90° sector of an annular area. The image plane display is shown in FIG. 13, the crossed order to the upper right is the 90° sector transformation of the square grid structure (object) at the lower left. The two crossed grid structures may be placed in different planes, e.g., one in the object plane and the other in F in the embodiment of FIG. 3. The present invention provides convenient and powerful optical techniques for establishing a space-variant system; they are practical and efficient in most situations. General types of coordinate transformations as well as local image modifications such as translation, stretching and rotation may be achieved. The optical techniques can be used to solve problems in field flattening, imaging on curved surfaces, distortion correction, or in replacing complicated conventional devices such as zoom lenses and image rotators. Coding and decoding of information as well as general cryptography are among their many natural applications.

Although othe prior art techniques are available to rovide modified images, such as using corrector plates, xicons, conical lenses. ring lenses; fun house mirrors and shower glass type plates for distorting images; and image processing with digital techniques, fiber optics devices, scanning systems, both optical and electronic; the prior art techniques are mainly indirect and/or complex in contradistinction to the simplified powerful and efficient technique of the present invention.

While the invention has been described with reference to its preferred embodiment, it will be understood by those skilled in the art that various changes may be made and equivalents may be substituted therefor without departing from the true spirit and scope of the invention. In addition, many modifications may be made to adapt a particular situation or material to the teaching of the invention without departing from its essential teachings.

What is claimed is:

1. A method for providing optical geometric transformations of an information conveying object distribution at a first plane such that the information is discernable in a stretched form at a second plane comprising the steps of:

forming an object distribution at said first plane, interposing a lens element between the object distribution and said second plane, said lens element being separated from the object distribution and said second plane by a distance equal to its focal length, and positioning a transformation hologram having a predetermined varying phase profile substantially different from said object distribution adjacent said object distribution at said first plane, said predetermined varying phase profile corresponding to a desired stretching transformation, the object distribution being stretched by the phase variation of said transform and said lens element producing at said second plane a light distribution which corresponds to the desired stretched transformation.

* * * * *